Oct. 8, 1940.  W. V. COUSINS  2,216,720
PLANTER
Filed Oct. 26, 1938  2 Sheets-Sheet 1
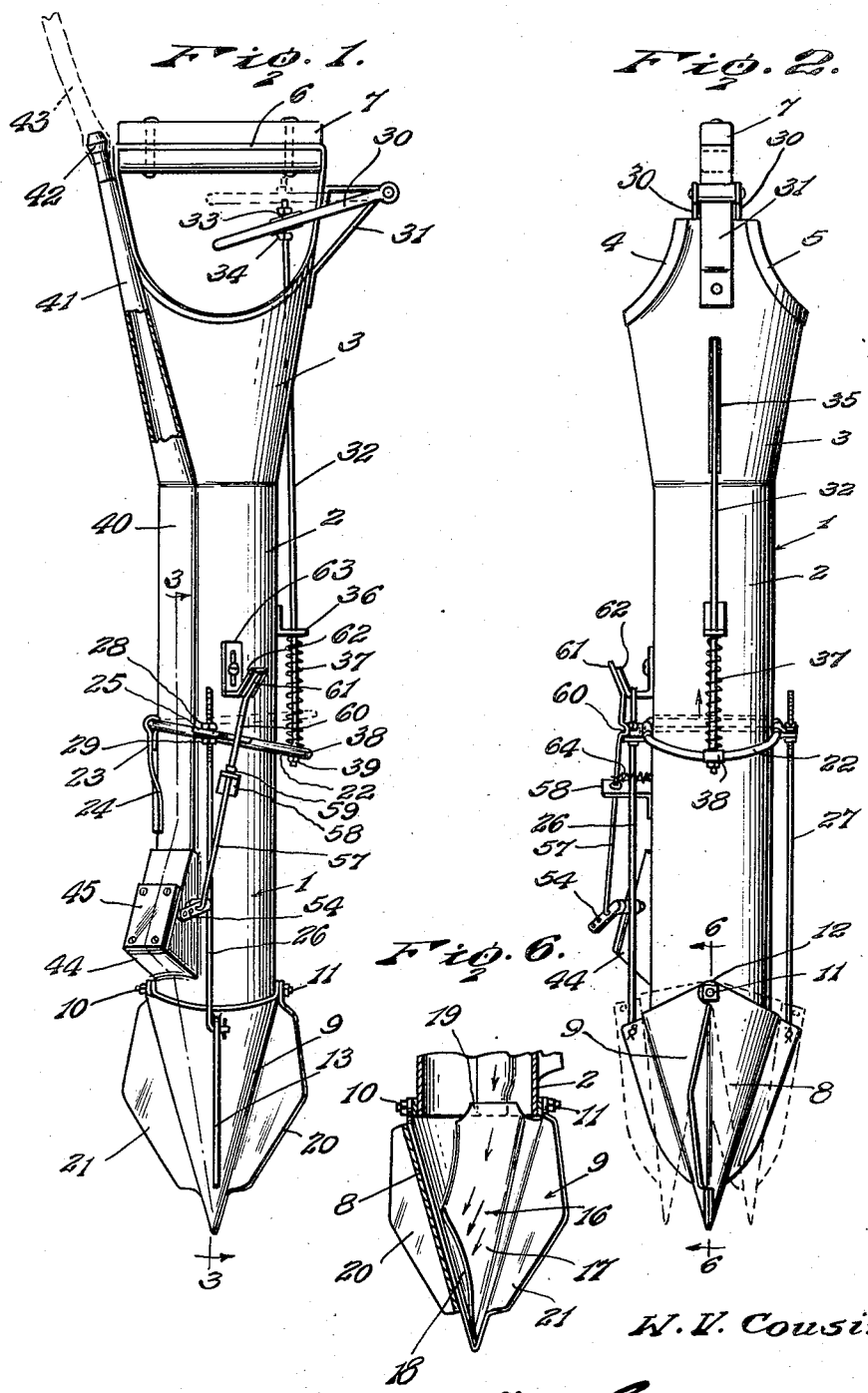
Inventor
W. V. Cousins.
By Lacey & Lacey, Attorneys Oct. 8, 1940. W. V. COUSINS 2,216,720
PLANTER
Filed Oct. 26, 1938 2 Sheets-Sheet 2
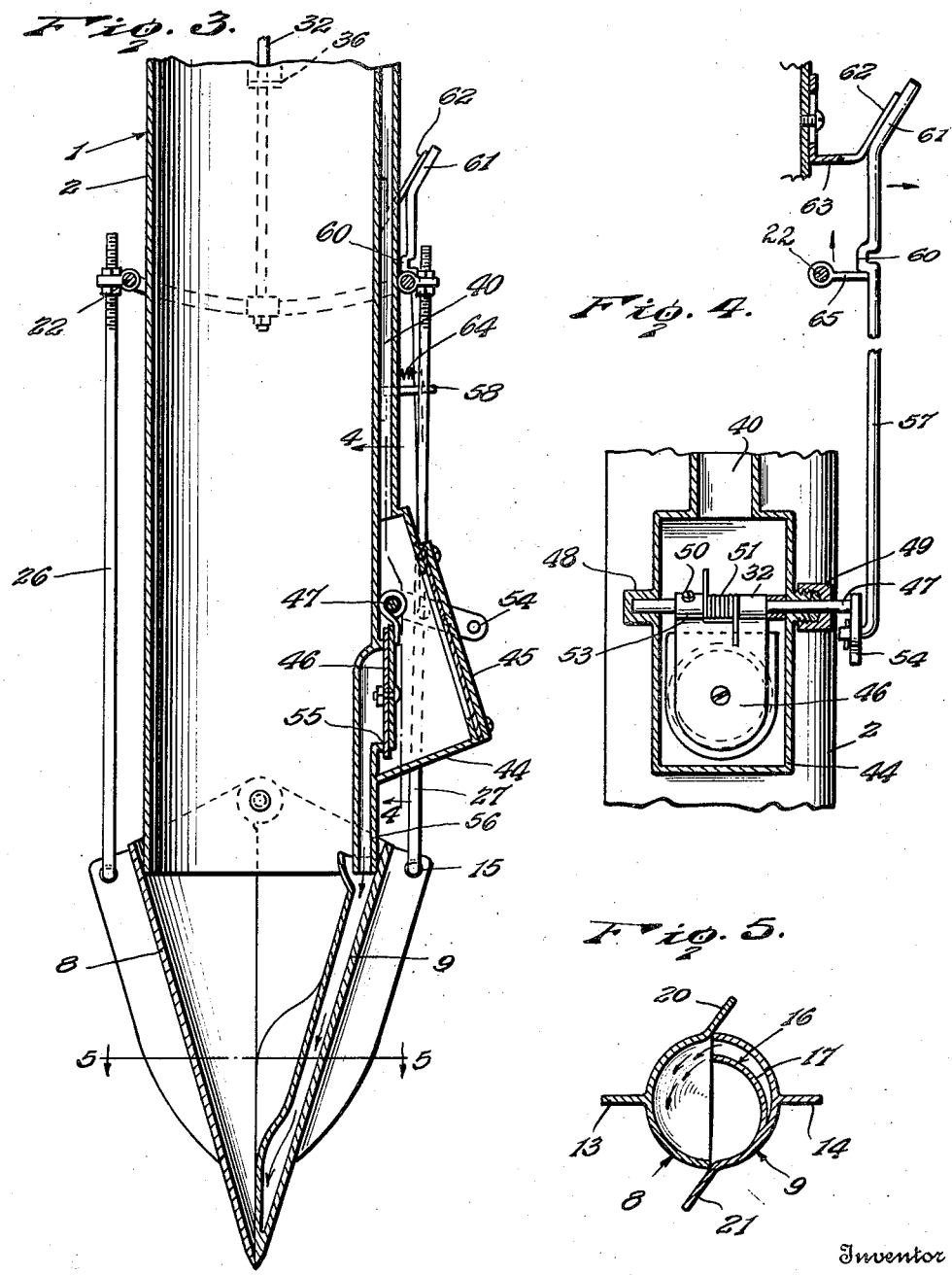
Inventor
W. V. Cousins.
By Lacy & Lacy, Attorneys Patented Oct. 8, 1940

2,216,720

UNITED STATES PATENT OFFICE 2,216,720

PLANTER

Willard V. Cousins, Nathalie, Va.

Application October 26, 1938, Serial No. 237,127

9 Claims. (Cl. 111—6)

This invention relates to an improved planter more particularly adapted for use in setting out tobacco and other plants.

One of the principal objects of my invention is to provide a device of this character wherein provision is made for carrying water on the back of the operator so that the weight of the planter itself will be materially reduced.

Another object of the invention is to provide a planter which, in view of the fact that the water supply therefor is carried apart from the planter itself, will be of constant light weight, the weight not varying as the water supply diminishes.

Another object of the invention is to provide a planter which will set the plant roots in wet earth and cover said wet earth with dry soil so that the water around the plant roots will be retained much longer, with the result that less water is required to set the plant and the action of the sun and atmosphere will not cause the moist earth around the plant to harden and bake.

Another object of the invention is to provide a planter which may be operated with equal facility with either the right or left hand.

A further object of the invention is to provide a planter which may be operated with the utmost facility.

As a further object, the invention seeks to provide a planter which will quickly and easily form a hole in the soil in which a plant is to be set and which will insure the setting of said plant in the middle of the hole.

And as a still further object, the invention seeks to provide a planter wherein the shovels employed are each movable and are so designed that, after a plant has been set, the hole may be filled by merely twisting the planter with the hand.

Other and incidental objects of the invention, not apparent from the foregoing, will appear during the course of the following description.

My improved planter is illustrated in the accompanying drawings forming a part of the invention, wherein:

Figure 1 is a side elevation of the device, partly shown in section.

Figure 2 is a side elevation taken at right angles from that of Figure 1.

Figure 3 is a vertical sectional view on the line 3—3 of Figure 1, on an enlarged scale.

Figure 4 is a vertical sectional view on the line 4—4 of Figure 3, on an enlarged scale.

Figure 5 is a horizontal detail sectional view on the line 5—5 of Figure 3.

Figure 6 is a detail vertical sectional view on the line 6—6 of Figure 2.

Referring now more particularly to the drawings, wherein similar numerals of reference will be seen to designate like parts throughout the various views, the numeral 1 indicates, in general, the barrel of my improved planter. The barrel 1 includes a central portion 2 which is of uniform diameter throughout its length and has an upper portion 3 gradually enlarged toward its upper end to assume substantially funnel-shape. As best shown in Figures 1 and 2 of the drawings, the upper end portion 3 of the barrel is cut away at diametrically spaced points to define mouths 4 and 5 for receiving plants, as will be discussed in more detail hereinafter. The upper extremities of the portion 3 are, between the mouths 4 and 5, connected by a handle strap 6 which is substantially flat throughout the major portion of its length. The handle strap 6 accommodates thereon handle members which define a handle 7. It will be understood that the handle 7 is disposed far enough above the mouths 4 and 5 so that unimpeded entry of a plant through either of said mouths into the upper portion 3 of the barrel will be permitted.

Mounted on the lower end of the barrel 1 are shovels 8 and 9. As will be seen clearly in Figures 1 and 3 of the drawings, the shovels are pivotally mounted in cooperating relation by means of bolts 10 and 11 which extend through ears 12 formed in the corresponding upper end portions of said shovels and through the lower end portion of the central portion 2 of the barrel. It will be seen that the shovels are capable of swinging to digging position, as shown in full lines in Figure 2, or to the position shown in dotted lines in Figure 2, for excavating an opening preparatory to placing a plant therein. The shovels 8 and 9 are each formed with vanes 13 and 14 which are tapered toward their lower ends and merge into the walls of the shovels. As will be seen, the vanes are disposed medially of the width of the shovels and are apertured at their upper ends, as shown at 15.

The shovels 8 and 9 are, to outward appearance, of identical construction. Reference is now had particularly to Figures 5 and 6 of the drawings, wherein is shown in more detail the construction of the shovel 9. The shovel 9 is provided, throughout the major portion of its length, with a nozzle 16. The nozzle is formed by a wall of the inner surface of the shovel 9 and a nozzle plate 17 which is relatively wide and substantially obliquely disposed relative to the vertical. The nozzle 16 is flattened throughout its length and is formed with a flattened mouth 18 which opens adjacent one edge of the shovel and is disposed obliquely with respect to the length of said nozzle. At its upper end, the nozzle 16 is formed with a lip 19, the purpose of which will be explained in more detail hereinafter. It will be seen that water, passing through the nozzle and into the opening will flow obliquely downwardly and will be given a swirling motion so that it will completely saturate the roots of a plant to be set as well as saturate the earth about the plant.

To facilitate turning in dry earth over the wet dirt around the plant roots and filling the hole in which the plant is set, I provide cutting members 20 and 21 which are of substantially obtuse angular formation and taper from their midpoints toward each of their corresponding ends. As seen in Fig. 5, the cutting members are substantially tangentially disposed on the shovels and are disposed in diametric relation to each other. As will be further noted, the digging members are formed as a continuation of opposite corresponding side edges of the shovels. The vanes 13 and 14 are, as will be seen, disposed in a plane at right angles to the plane of the bases of the cutting members.

In order to control movement of the shovels 8 and 9, I provide operating mechanism which includes an operating ring 22. The operating ring surrounds the central portion 2 of the barrel 1 medially of its length and is pivotally connected thereto at one point by means of a loop 23. The loop 23 forms a portion of a strap 24 which is soldered or otherwise secured to said central portion 2. The ring 22 is, therefore, permitted to swing vertically always in surrounding relation to the central portion 2, with the loop 23 as a hinge or pivot. The ring 22 is formed at substantially diametrically opposite points and in a plane at right angles to the plane of the loop 23, with ears 25. The ears 25 receive therethrough the threaded upper end portions of connecting rods 26 and 27. The connecting rods have their lower ends bent at right angles and inserted through the apertures 15 in the vanes 13 and 14. A cotter key or other anchoring device is passed through the free lower end portions of the rods 26 and 27 so that displacement thereof from the shovels may not take place. Nuts 28 and 29 are carried on the corresponding upper end portions of each of the connecting rods 26 and 27 and permit adjustable connection between said rods and the ring 22. It should be understood that the nuts are spaced on the rods in such a manner that free rocking movement of the rods with respect to the ring will be permitted. It will now be understood that raising of the ring 22 on the pivot 23 will effect raising of the rods 26 and 27 and consequent spreading of the shovels 8 and 9 to the position shown in dotted lines in Figure 2. In order to permit convenient control of the shovels 8 and 9, I provide a lever 30. The lever 30 is mounted on a bracket 31 carried at the side of the upper portion 3 of the barrel and straddles the wall of the upper portion and extends to a position below the handle 7 for convenient manual engagement. The lever has connected therewith an operating rod 32. The operating rod has its upper end threaded and extends through the lever 30 substantially medially of its length. In order to permit adjustment of the rod 32 on the lever, I provide adjusting nuts 33 and 34. As in the case of the rods 26 and 27, the adjusting nuts 33 and 34 are spaced sufficiently apart to permit free rocking motion of the lever 30 on the rod 32. Raising of the lever will, of course, shift the rod upwardly. The rod 32 extends downwardly and out through a longitudinal slot 35 and extends the major portion of its length exteriorly of the barrel 1. A bracket 36 is mounted on the central portion 2 of the barrel 1 and receives therethrough the lower end portion of the rod 32. The bracket 36 also forms an end terminal for a coil spring 37, the lower end which engages a socket 38 on the ring 22. The lower end of the rod 32, of course, extends through the ear 38 and is held loosely thereon by means of a nut 39. It will now be understood that by raising the lever 30, the rod 32 will be shifted upwardly against the tension of the spring 37 for shifting the ring 22 and thus shifting the shovels 8 and 9 to open position. The spring 37 will, of course, normally retain the shovels in closed position, as shown in full lines in the drawings. It is in this position, of course, that the device is used for effecting an initial digging operation.

The barrel 1 has secured to its central portion 2, at a point on its circumference, a conduit 40. The conduit is formed by a portion of the wall of the central portion 2 and an outer member which has its corresponding edges secured to the central portion of the barrel 1. It should be understood that, if desired, a pipe of any ordinary construction may be employed in lieu of the conduit 40. The conduit 40 has an extension 41 which is carried on the upper portion 3 of the barrel and terminates in a nipple 42 at its upper end. The nipple is adapted to receive thereon the lower end portion of a flexible hose, shown in dotted lines at 43. The hose 43 is connected with a canvas bag, tank, or other fluid source which is preferably to be strapped on the back of the operator of the device. The lower end of the conduit 40 terminates in a valve housing 44 which is formed integral with the portion 2 of the barrel 1 and is tapered in height from its lower end toward its upper end. The housing 44 has a plate 45 which closes the major portion of the upper surface of said housing but is removable for permitting access to be gained to the valve in the housing.

Mounted in the housing 44 is a fluid valve, shown generally at 46. This valve is mounted on a rod 47 which extends laterally through the housing and is supported at each side thereof by means of bearings 48 and 49. The bearing 49 is in the nature of a gland or packing for the reason that the rod 47 extends clear of the housing at that point. The valve 46 is held in place on the rod 47 by means of a set screw 50. A coil spring 51 surrounds the rod 47, between adjacent ears 52 and 53 of the valve and has one end bearing against the floor of the housing 44 and the other end against the valve 46. The spring 51 normally retains the valve in closed position. At the free exposed end of the rod 46 I have mounted a connecting link 54. The valve 46 cooperates with a valve seat 55 which is formed by the wall of the barrel 1. The valve seat 55 is connected with the lower end of the central portion 2 of the barrel by a short tube 56 which extends into the nozzle 16. That is to say, the lip 19 of the nozzle 16 extends about the lower end of the pipe 56 so that movement of the shovel 9 with respect to the barrel will be permitted. The valve 46 will operate for controlling flow of liquid from the liquid source to the nozzle 16. It is desirable that the valve 46 be opened for only a short period of time during each planting operation so that but a small amount of water will flow about the plant within the opening. To accomplish this, I employ control mechanism including a valve control rod 57 which has its lower end connected with the link 54. The rod 57 is supported substantially medially of the length thereof by a bracket 58 which is slotted to permit shifting of the rod toward and away from the face of the barrel 1 within the confines of the bracket. A stop 59 is formed on the rod 57 adjacent the bracket and limits movement of the rod. As best seen in Figure 4 of the drawings, the rod 57 is formed, near its upper end portion, with a detent 60 and, at said upper end portion, the rod is bent obliquely to form a cam member 61. The cam member is engageable with the cam surface 62 of a bracket 63 which is mounted on the barrel beneath the rod. A small coil spring 64 normally urges the rod toward the barrel and into engagement with a lug 65 on the ring 22.

In operation, a supply of liquid is placed in the reservoir and the tube 43 is connected to the nipple 42. A plant or plants are placed in the barrel 2 through either of the mouths 4 or 5. When it is desired to set a plant, it is only necessary to force the shovels 8 and 9 into the ground for forming a hole into which the plant is to be set. The lever 30 is then lifted for releasing the plant into the hole and water around the roots of said plant. A twist of the barrel completes filling the hole with dry earth. As the operating rod 32 is raised for raising the ring, as hereinbefore described, the lug 65 will engage the detent 60 and raise the rod 57 for shifting the valve 46 to open position, thereby allowing liquid to pass therethrough and into the nozzle 16 from whence it will flow about the plant in a swirling manner for thoroughly saturating the roots of the plant and the ground thereabout. As before stated, it is desired that but a small amount of liquid flow through the conduit and the handle at each operation. Therefore, as the rod 57 is raised, the cam 61 will ride up on the cam face of the bracket 63 until the detent 60 is freed from the lug 65. The spring 51 will then instantly draw the valve 46 to closed position and the supply of liquid will be cut off. As soon as the ring 22 is returned to its inoperative position, after the shovels have been closed, the detent will again be in a position to engage the lug 65 for a further irrigating operation.

After a plant has been properly set in the opening provided therefor and properly irrigated, the device is twisted in the hand for effectually returning the soil about the plant so that said plant will be properly set in the ground. It is believed that the construction and operation of my improved planter will now be thoroughly understood.

Having thus described the invention, what I claim is:

1. In a planter, a barrel, a handle carried at one end of the barrel, a conduit carried on the barrel, a source of liquid supply exteriorly of the barrel, a flexible connection between the liquid supply source and the conduit, a valve carried by the barrel in one end portion of the conduit, shovels pivotally connected with the barrel, a nozzle carried by one of said shovels and having an inclined flattened discharge opening, means on the barrel near the handle and connected with the shovels for excavating an opening made by the shovels, and means operatively connected with said last mentioned means for opening the valve and permitting liquid flow through the opening.

2. In a planter, a barrel having an upper end portion cut away to form mouths and a handle, a bracket carried by the upper portion, a lever carried by the bracket, shovels carried by the barrel at its lower end portion, means pivotally connecting the shovels with the barrel, a rod connected with the lever, a ring surrounding the barrel, connecting rods connecting the ring with the shovels, said connecting rods being operatively connected with the first mentioned rod, a valve housing on the barrel, a conduit on the barrel connected with the housing, a valve in the housing, a control rod connected with the valve and operatively connected with the ring, and means for disengaging the control rod from the ring upon movement of said ring a predetermined distance, said ring being operable for shifting the connecting rods and opening the shovels and simultaneously shifting the control rod and opening the valve whereby fluid flow will be permitted to pass to the shovels.

3. In a planter, a barrel, a handle at one end thereof, shovels pivotally mounted at the opposite end of the barrel and defining a digging implement, said barrel being adapted to contain a plant to be set, means for shifting the shovels away from each other for excavating an opening made by the digging implement and allowing a plant in the barrel to be positioned in the opening, one of said shovels having a flat nozzle for directing a liquid flow downwardly in a swirling motion, and means for separating the shovels and simultaneously causing liquid flow through the nozzle.

4. In a planter, a shovel having an arcuate surface and being tapered in length toward one end, said shovel being formed with a substantially tangentially disposed cutting member, and a nozzle plate carried on the inner wall of the shovel and cooperating therewith to define a nozzle, said nozzle being obliquely mounted for directing a fluid flow downwardly in a swirling manner.

5. In a planter as recited in claim 4, wherein the nozzle is substantially arcuate in cross section.

6. In a planter as recited in claim 4, wherein the nozzle has a mouth obliquely disposed with respect to the length of said nozzle.

7. In a planter, a barrel, shovels carried by the barrel, a handle carried by the barrel at its opposite end, an operating ring surrounding the barrel and pivotally connected thereto, connecting rods operatively connecting the ring with the shovels, a lever carried by the handle, a rod connecting the lever with the ring, said rods, ring and lever cooperating to open the shovels when said lever is raised whereby an opening may be excavated and entry of a plant carried in the barrel into the opening permitted.

8. In a planter as recited in claim 7, including a conduit on the barrel, a valve connected with the conduit, a rod for the valve, a link on the rod, an operating rod connected with the link and having a detent engageable with the ring upon shifting thereof for opening the valve and permitting fluid flow through the conduit, and means for disengaging the detent from the ring and permitting closing of the valve after movement of the ring for a predetermined distance.

9. In a planter, a barrel, a shovel connected therewith and having a nozzle, a conduit on the body, a valve housing on the barrel, a valve and valve seat in the housing, said valve having a rod, a link on the rod, an operating rod connected with the link and slidable in spaced relation to the barrel thereon, said operating rod having a detent, a bracket on the barrel, a stop cooperating with the bracket and limiting movement of the operating rod, an operating ring on the barrel, means connecting the ring with the shovel, said ring and last mentioned means moving the shovel to a hole excavating position, said ring engaging the detent for shifting the operating rod and opening the valve to permit fluid flow to said nozzle, and cam means for disengaging the detent from the ring and permitting closing of the valve.

WILLARD V. COUSINS.